(12) United States Patent  
Han

(10) Patent No.: US 9,077,189 B2  
(45) Date of Patent: Jul. 7, 2015

(54) BATTERY PROTECTION CIRCUIT MODULE DEVICE

(71) Applicant: KOREA LSI Co., Ltd, Seoul (KR)

(72) Inventor: Su Jung Han, Seoul (KR)

(73) Assignee: KOREA LSI Co., Ltd, Seoul (KR)

( * ) Notice: Subject to any disclaimer, the term of this patent is extended or adjusted under 35 U.S.C. 154(b) by 320 days.

(21) Appl. No.: 13/705,313

(22) Filed: Dec. 5, 2012

(65) Prior Publication Data

US 2014/0097798 A1  Apr. 10, 2014

(51) Int. Cl.
*H02J 7/00* (2006.01)

(52) U.S. Cl.
CPC .................. *H02J 7/0029* (2013.01)

(58) Field of Classification Search
CPC ....................................... Y02E 60/12
USPC ............................................ 320/128
See application file for complete search history.

(56) References Cited

U.S. PATENT DOCUMENTS

2012/0139479 A1* 6/2012 Yun .............................. 320/107
2012/0139494 A1* 6/2012 Kim .............................. 320/128

FOREIGN PATENT DOCUMENTS

KR  10-2011-0135289 A  12/2011
KR  10-1162792 B1  7/2012
KR  10-1182868 B1  9/2012

* cited by examiner

*Primary Examiner* — Edward Tso
*Assistant Examiner* — Ahmed Omar
(74) *Attorney, Agent, or Firm* — KORUS Patent, LLC; Seong Il Jeong

(57) ABSTRACT

Disclosed herein is a battery protection circuit module device. The battery protection circuit module device includes a charging unit, a battery protection circuit module, and a system. The charging unit includes first and second MOSFET switches, and supplies externally input power to a battery or a system. The battery protection circuit module includes the battery, third and fourth MOSFET switches configured to be selectively turned on and off, a resistor and a capacitor configured to supply the voltage of the battery to the PCM controller as driving power, and the PCM controller configured to control the third and fourth MOSFET switches. The system is operated using the voltage of the battery or externally input voltage. The third and fourth MOSFET switches of the battery protection circuit module are connected via a common drain structure and a common drain terminal is connected to an internal ground.

3 Claims, 7 Drawing Sheets

BATTERY PROTECTION CIRCUIT MODULE DEVICE

BACKGROUND OF THE INVENTION

1. Field of the Invention

The present invention relates generally to a battery protection circuit module device and, more particularly, to a battery protection circuit module device, which is capable of significantly preventing a reduction in the duration of use of a battery attributable to a voltage drop resulting from peak current and on-resistance occurring upon discharging because the plurality of switching devices of a battery protection circuit module is configured to be selectively used upon charging or discharging and thus the on-resistance of the switching devices occurring upon discharging is reduced to half, which is capable of considerably reducing the manufacturing cost required to manufacture a charger integrated circuit (IC) because a low rated device can be used in the charger IC, and which is capable of increasing the stability and reliability of a portable product because a charger and a system other than a protection circuit module can remain insulated from a stationary device even when the portable product is coupled to the stationary device and thus the portable product is not influenced by abnormal input from the stationary device.

2. Description of the Related Art

Currently, in many mobile and portable products, a large amount of power is required to drive a high-performance processor IC so as to perform various functions and multi-processing, and to drive a large-screen display. The capacities of batteries tend to increase in order to meet consumers' desire for long-term battery use from a single charge.

Efforts to increase the system efficiency so as to make batteries usable for a long time as well as to increase the capacities of the batteries have been made. In particular, due to the application of a high-performance processor, the amount of peak current that is instantaneously discharged is very large, and thus voltage drop attributable to the resistance of a power line extending from the battery to the system is very high. This high voltage drop causes the system to consider the current state of the battery to be lower than the actual charge level, so that system shutdown attributable to low battery voltage occurs at an early stage, thereby reducing the duration of use of the battery. Since such voltage drop also influences efficiency, a protection circuit module, including switches with low on-resistance, is required to reduce the voltage drop.

The protection circuit module is a protection circuit that is provided for a battery in order to enable the battery, such as a lithium-ion battery or a lithium polymer battery, to be stably operated. It is essentially applied to the battery packs of almost all mobile and portable devices.

A protection circuit module is a module that is essentially applied to batteries, such as lithium-ion batteries and lithium polymer batteries, in order to control the charging and discharging of the batteries and protect the batteries from abnormal states such as high/low voltage, excessive current and high temperature. The protection circuit module includes two switches and a control circuit configured to operate these switches.

In the conventional protection circuit module, two switches are turned on regardless of whether the battery is charged with power or power has been discharged from the battery, and the two switches are connected in series. Therefore, the sum of the on-resistances of respective switches becomes the on-resistance of protection circuit module switches.

That is, in terms of a structure, on-resistance that doubles the on-resistance of a single switch is generated. The reason why the two switches are connected in series is that electrical switches fabricated in the form of semiconductors generally have an electrical connection path formed in a parasitic manner. In the case of a widely used N-channel MOSFET, a parasitic diode is formed from its source to its drain, so that an electrical connection path is presented by the diode in the direction from the source to the drain even when the N-channel MOSFET is turned off. Insulation is required to electrically separate the battery from the charger or system. If a single N-channel MOSFET is used, electrical insulation cannot be achieved in one direction. In contrast, if two N-channel MOSFETs are used and form a common drain structure, the cathodes of parasitic diodes are opposite each other, so that an insulation state in which an electrical connection path has been completely blocked in the opposite directions can be maintained.

FIGS. 1 and 2 show conventional battery protection circuit module devices.

FIG. 1 is an application circuit diagram of a portable system to which one conventional battery protection circuit module device has been applied, and FIG. 2 is the other conventional battery protection circuit module device.

Referring to FIG. 1, the conventional battery protection circuit module device includes:

a charging unit 1 configured to include first and second MOSFET switches M1 and M2, and to supply externally input power to a battery BAT or a system 3;

a battery protection circuit module 2 configured to include the battery BAT, third and fourth MOSFET switches M5 and M6 connected in series to the minus terminal of the battery BAT, and configured to be selectively turned on and off under the control of a PCM controller 21 so that the battery BAT is selectively and electrically connected to and disconnected from the outside; a resistor R1 and a capacitor C1 configured to detect the voltage of the battery BAT and to supply the voltage of the battery BAT to the PCM controller 21 as driving power; and the PCM controller 21 configured to control the third and fourth MOSFET switches M5 and M6 based on the state of the voltage of the battery BAT so that the third and fourth MOSFET switches M5 and M6 are selectively turned on and off and thus the battery BAT is selectively charged and discharged; and the system 3 configured to be operated using the voltage of the battery BAT or externally input voltage.

The third and fourth MOSFET switches M5 and M6 are connected via a common drain structure so that their drains are opposite each other. Parasitic diodes formed in the MOSFET switches M5 and M6 in a parasitic manner are connected so that their cathodes are opposite each other. Accordingly, when the first and second MOSFET switches M5 and M6 are turned off, electrical insulation can be achieved.

The PCM controller 21 implements the basic functionality of performing charging when a power voltage source is connected between a VBAT terminal and a GND terminal and performing discharging when a load is connected therebetween, and additionally detects an abnormal state and controls the third and fourth MOSFET switches M5 and M6 in order to protect the battery BAT from excessive charging, excessive discharging, excessive current, high temperature or a short circuit.

The operation of the conventional battery protection circuit module device will now be described.

Upon the charging or discharging of the battery BAT, the third and fourth MOSFET switches M5 and M6 are turned on under the control of the PCM controller 21, and the battery BAT is charged with external power input through the charging unit 1, and power stored in the battery BAT is discharged and supplied to the system 3.

Meanwhile, FIG. 2 shows the other conventional battery protection circuit module device.

The battery protection circuit module 2 of the other conventional battery protection circuit module device includes: a battery BAT, first and second switches S5 and S6 connected in series to the plus terminal of the battery BAT, and configured to be selectively turned on and off under the control of a PCM controller 21 so that the battery BAT is selectively and electrically connected to and disconnected from the outside; a resistor R1 and a capacitor C1 configured to detect the voltage of the battery BAT and to supply the voltage of the battery BAT to the PCM controller 21 as driving power; and the PCM controller 21 configured to control the first and second switches S5 and S6 based on the state of the voltage of the battery BAT so that the first and second switches S5 and S6 are selectively turned on and off and thus the battery BAT is selectively charged and discharged The other conventional battery protection circuit module device is configured such that the first and second switches S5 and S6 are connected to the plus (+) terminal of the battery BAT. More stable operation can be achieved against abnormal charging and discharging because the first and second switches S5 and S6 are connected to the plus terminal of the battery BAT, and more accurate control can be achieved because the PCM controller 21 comes to have a stable reference electric potential (ground).

However, the conventional technology is configured such that the two MOSFET switches or the two switches are turned on upon discharging, so that a voltage drop attributable to a peak current occurs due to double on-resistance when power is discharged from the battery to the system, thereby reducing the duration of use of the battery. Accordingly, there is a demand for a scheme for reducing on-resistance.

Up to the present day, a scheme for reducing the on-resistance of each switch has been pursued. Larger switches are required to reduce on-resistance, and thus the cost increases. Furthermore, the increase in the areas of the switches is limited by the mechanical problem of the battery structure (mobile and portable products tending to have slim shapes), and thus there is a demand for a new scheme.

Currently, a protection circuit module structure and a charger and system for charging a battery use the same ground. That is, an input power voltage source (normally, an adapter) configured to supply power in order to perform charging using external power, a charger, and a portable system share a common ground. Since a portable product is normally insulated from a stationary device and is supplied with power by an internal power source, that is, a battery, the internal voltage of the portable product cannot be increased above battery voltage unless a special boosting circuit is provided. However, since it is necessary to connect to the stationary device so as to perform charging and data signal transfer and exchange, design is carried out on a high rated voltage basis in order to deal with the stationary device. For this reason, the battery voltages of mobile devices are mostly 4.2 V in the case where a single cell is used, whereas the input voltages of chargers configured to charge a battery are normally a rated voltage of 28 V. This is intended to deal with the abnormal operation of the power voltage source and an abnormal external input such as electrostatic discharge (ESD) or surge.

Accordingly, devices with high rated voltage should be used in the charger circuit, and therefore the manufacturing cost of the charger increases. The charger contains a common drain structure, in which two switches are opposite each other and connected in series like the control switches of the protection circuit module, in order to block reverse current flowing in the direction from the battery to a power voltage source in the case of no charging, that is, in order to insulate the battery from an input terminal power voltage source, like the PCM circuit used for the battery, and is intended to reduce the on-resistance of the switches in order to improve charging efficiency. However, the areas of the switches should be increased so as to achieve high rated voltage and low on-resistance, and therein the problem of incurring the increase in the manufacturing cost arises.

SUMMARY OF THE INVENTION

Accordingly, the present invention has been made keeping in mind the above problems occurring in the prior art, and an object of the present invention is to provide a battery protection circuit module device, which is capable of significantly preventing a reduction in the duration of use of a battery attributable to a voltage drop resulting from peak current and on-resistance occurring upon discharging because the plurality of switching devices of a battery protection circuit module is configured to be selectively used upon charging or discharging and thus the on-resistance of the switching devices occurring upon discharging is reduced to half, which is capable of considerably reducing the manufacturing cost required to manufacture a charger IC because a low rated device can be used in the charger IC, and which is capable of increasing the stability and reliability of a portable product because a charger and a system other than a protection circuit module can remain insulated from a stationary device even when the portable product is coupled to the stationary device and thus the portable product is not influenced by abnormal input from the stationary device.

In order to accomplish the above object, the present invention provides a battery protection circuit module device, including a charging unit configured to include first and second MOSFET switches and to supply externally input power to a battery or a system; a battery protection circuit module configured to include the battery, third and fourth MOSFET switches connected in series to the minus terminal of the battery, and configured to be selectively turned on and off under the control of a protection circuit module (PCM) controller so that the battery is selectively and electrically connected to and disconnected from an outside; a resistor and a capacitor configured to detect a voltage of the battery and to supply the voltage of the battery to the PCM controller as driving power; and the PCM controller configured to control the third and fourth MOSFET switches based on a state of the voltage of the battery so that the third and fourth MOSFET switches are selectively turned on and off and thus the battery is selectively charged and discharged; and the system configured to be operated using the voltage of the battery or externally input voltage; wherein the third and fourth MOSFET switches of the battery protection circuit module are connected to each other via a common drain structure and a common drain terminal is connected to an internal ground, so that only the fourth MOSFET switch is turned on upon discharging.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
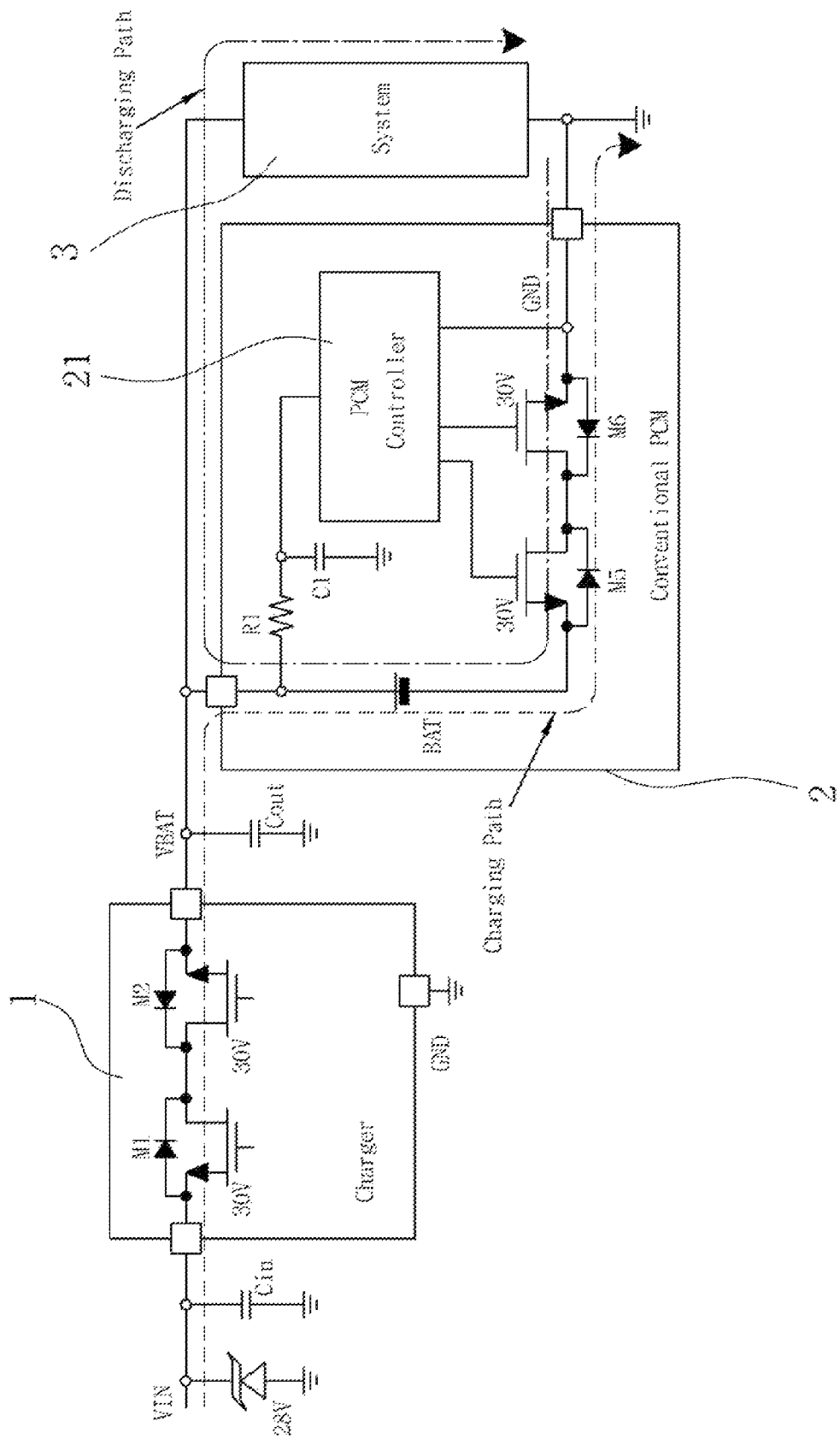
FIG. 1 is a circuit diagram showing a conventional battery protection circuit module device.
Figure 2:
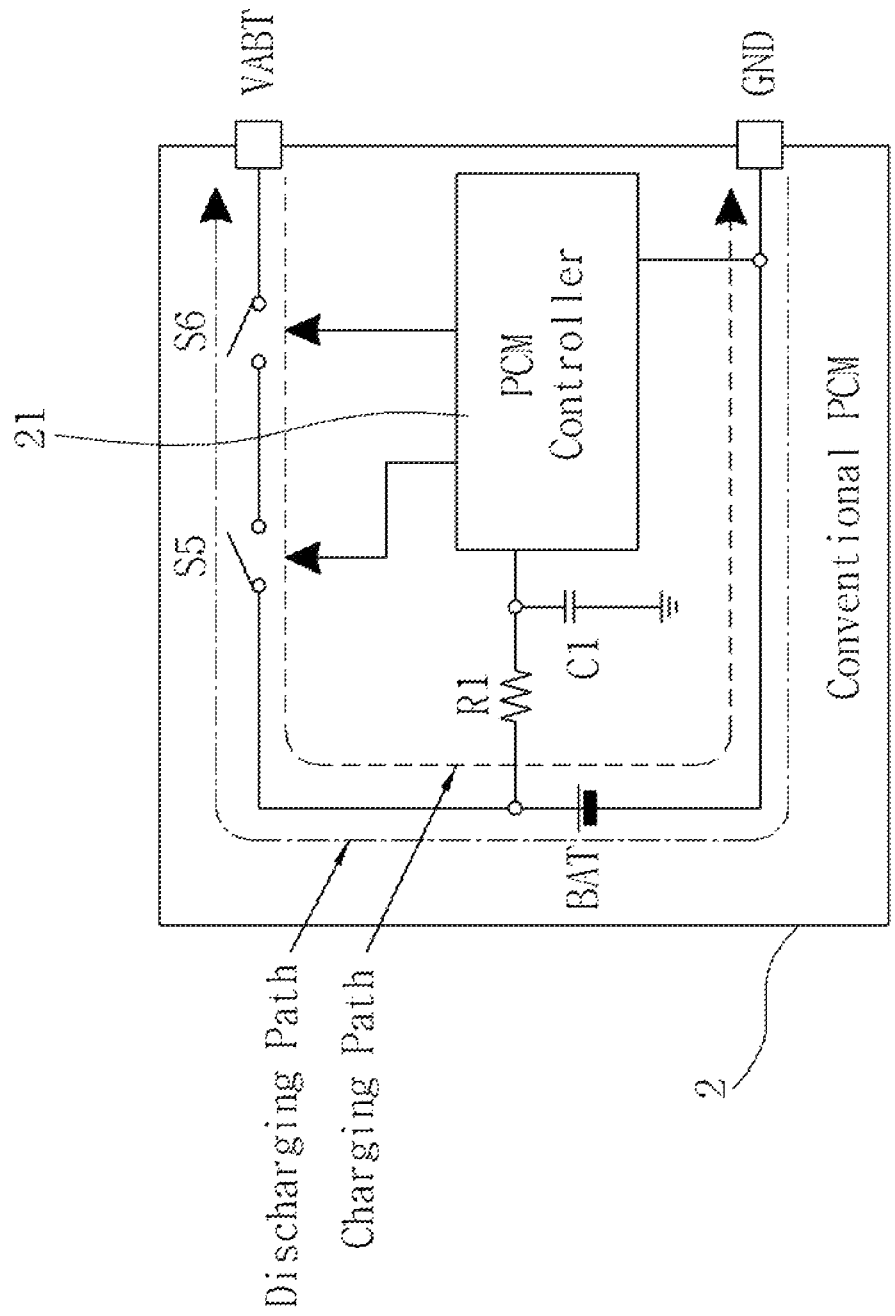
FIG. 2 is a circuit diagram showing another conventional battery protection circuit module device.

Reference now should be made to the drawings, throughout which the same reference numerals are used to designate the same or similar components.

Preferred embodiments of the present invention will be described with reference to FIGS. 3 to 7.

In the following description of the present invention, the same reference numerals are assigned to elements that are the same as the conventional elements, and redundant descriptions thereof will be omitted.

Furthermore, the present invention will be described using three preferred embodiments below.

First Embodiment

Figure 3:
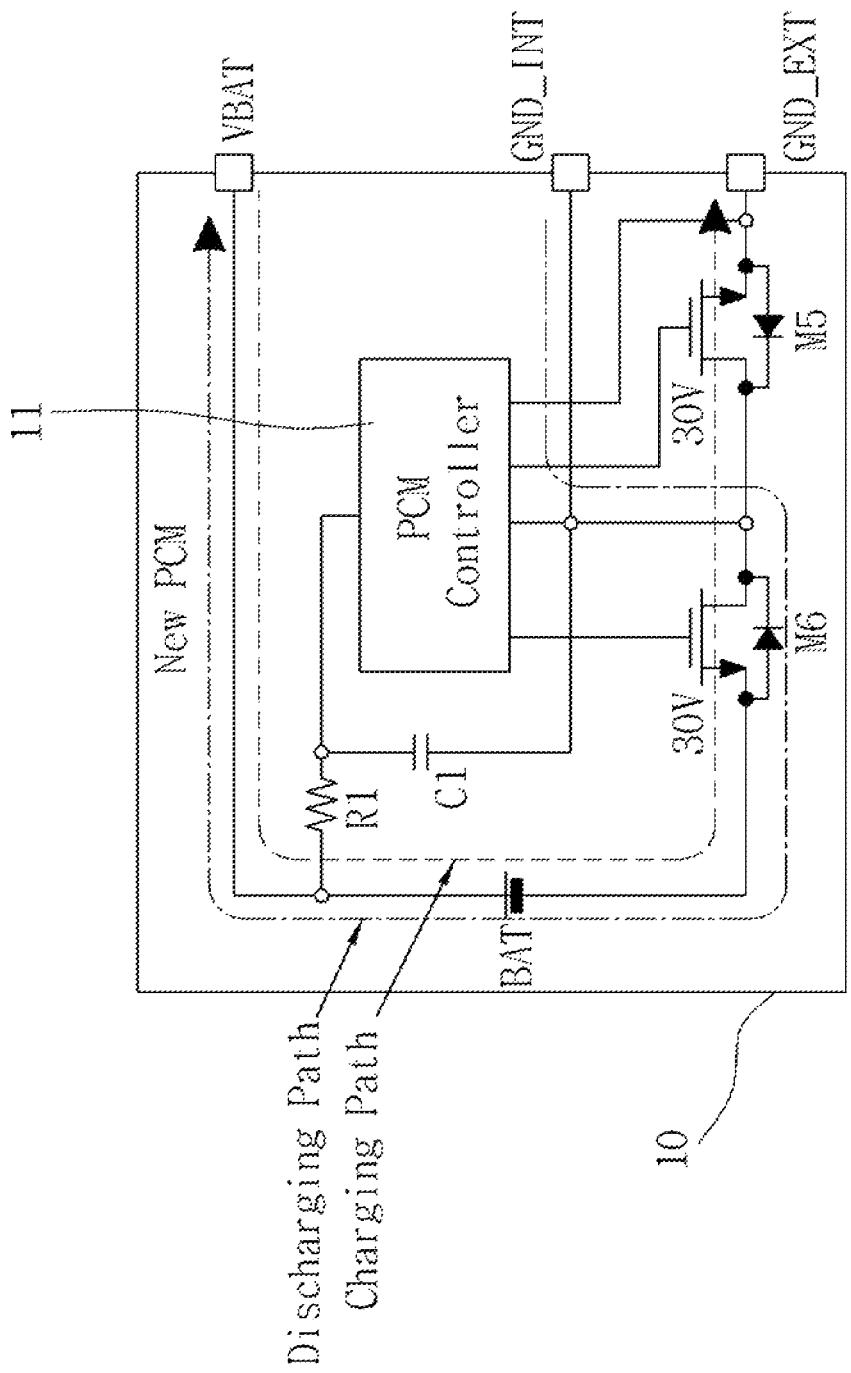
FIG. 3 is a circuit diagram showing a battery protection circuit module device according to a first embodiment of the present invention.
Figure 4:
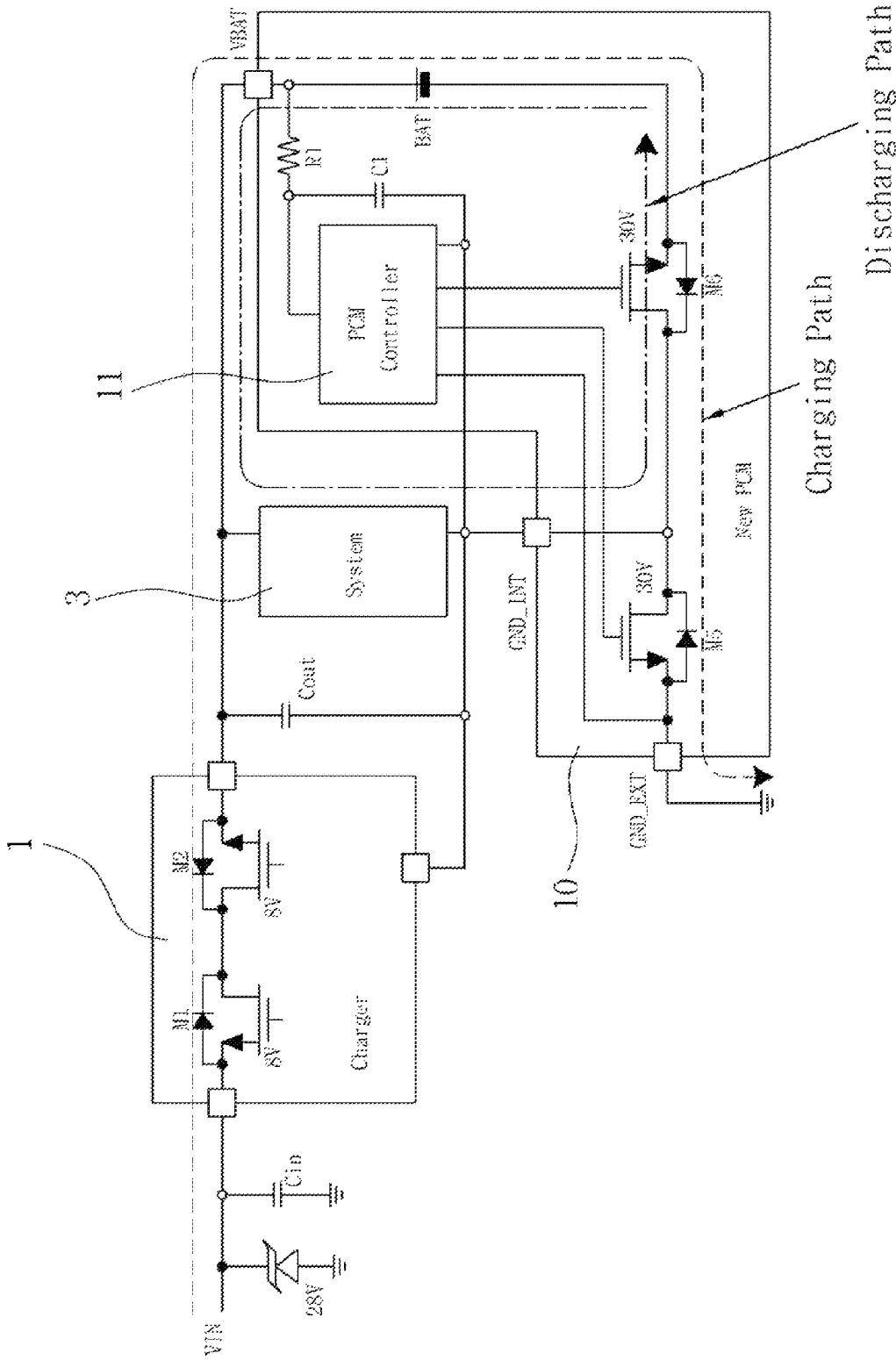
FIG. 4 is a diagram showing a portable system to which the battery protection circuit module device according to the first embodiment of the present invention has been applied.

FIGS. 3 and 4 illustrate a battery protection circuit module device according to a first embodiment of the present invention, which includes:

a charging unit 1 configured to comprise first and second MOSFET switches M1 and M2 and to supply externally input power to a battery BAT or a system 3;

a battery protection circuit module 10 configured to comprise the battery BAT, third and fourth MOSFET switches M5 and M6 connected in series to a minus terminal of the battery BAT, and configured to be selectively turned on and off under the control of a PCM controller 11 so that the battery BAT is selectively and electrically connected to and disconnected from an outside; a resistor R1 and a capacitor C1 configured to detect a voltage of the battery BAT and to supply the voltage of the battery BAT to the PCM controller 11 as driving power; and the PCM controller 11 configured to control the third and fourth MOSFET switches M5 and M6 based on a state of the voltage of the battery BAT so that the third and fourth MOSFET switches M5 and M6 are selectively turned on and off and thus the battery BAT is selectively charged and discharged; and the system 3 configured to be operated using the voltage of the battery BAT or externally input voltage;

wherein the third and fourth MOSFET switches M5 and M6 of the battery protection circuit module 10 are connected to each other via a common drain structure and a common drain terminal is connected to an internal ground GND_INT, so that only the fourth MOSFET switch M6 is turned on upon discharging.

The battery protection circuit module 10 has three power terminals VBAT, GND_INT and GND_EXT, and the third and fourth MOSFET switches M5 and M6 are connected from the minus (−) terminal of the battery BAT to the external ground GND_EXT.

Furthermore, the third and fourth MOSFET switches M5 and M6 of the battery protection circuit module 10 are connected to each other via the common drain structure and the common drain terminal is connected to the internal ground GND_INT, so that only the fourth MOSFET switch M6 is turned on upon discharging.

Accordingly, upon charging, as the PCM controller 11 turns on the third and fourth MOSFET switches M5 and M6, external power flowing into the charging unit 1 is supplied along the charging path of the above diagram and then the battery BAT is charged with the external power.

Upon discharging, as the PCM controller 11 turns on only the fourth MOSFET switch M6, power having passed through the system 3 is discharged while forming a discharging path which passes through the internal ground GND_INT and the fourth MOSFET switch M6.

That is, upon charging, the third and fourth MOSFET switches M5 and M6 are all turned on and then charging is performed. Upon discharging, only the fourth MOSFET switch M6 is turned on and then discharging is performed. Accordingly, the effect of on-resistance being reduced to half can be expected.

Accordingly, the switch on-resistance along the discharging path is reduced to half of the switch on-resistance along the charging path.

The PCM controller 11 operates in a charging mode when the voltage between the VBAT terminal and the external ground GND_EXT is within the operating voltage range of the PCM controller 11 and the voltage between the two terminals is higher than the voltage of the battery, and turns on both the third and fourth MOSFET switches M5 and M6. The PCM controller 11 operates in a discharging mode when the voltage between the VBAT terminal and the external ground GND_EXT is outside the operating voltage range of the PCM controller 11 and the voltage of the battery is within the operating voltage range of the battery, and turns on only the fourth MOSFET switch M6, thereby performing discharging. The PCM controller 11 turns off both the third and fourth MOSFET switches M5 and M6 when the voltage between the VBAT terminal and the external ground GND_EXT is outside the operating range of the PCM controller 11 and the voltage of the battery is outside the operating voltage range of the battery, and prevents the full discharging of the battery, thereby protecting the battery.

As described above, according to the first embodiment of the present invention, upon discharging, only the fourth MOSFET switch M6 of the battery protection circuit module 10 is turned on and allows discharging to be performed, so that on-resistance is reduced.

Furthermore, the ground of the charging unit 1 is connected to the internal ground GND_INT. In the present invention, the external ground GND_EXT is connected to the ground of an input terminal power voltage source. In the case where abnormal voltage is applied form the outside, the conventional technology requires countermeasures against high voltage because the charging unit and the PCM controller are connected in parallel to the input terminal voltage source.

In contrast, in the present invention, the ground of the charging unit 1 is connected to the internal ground GND_INT of the battery protection circuit module 10, and the third MOSFET switch M5 is connected in series between the internal ground and the external ground. That is, a connection is formed from the input terminal power voltage source through the first and second MOSFET switches M1 and M2 of the charging unit 1, the system 3, the internal ground GND_INT and the third MOSFET switch M5 to the external ground GND_EXT. Accordingly, since the voltage applied to the charging unit 1 is the same as the voltage applied to the battery and the system, a device having a low rated voltage may be used.

Furthermore, upon charging, when abnormal voltage is applied from the outside, the third MOSFET switch M5 is turned off, thereby protecting the system and the charging unit on a more stable basis.

Second Embodiment

Figure 5:
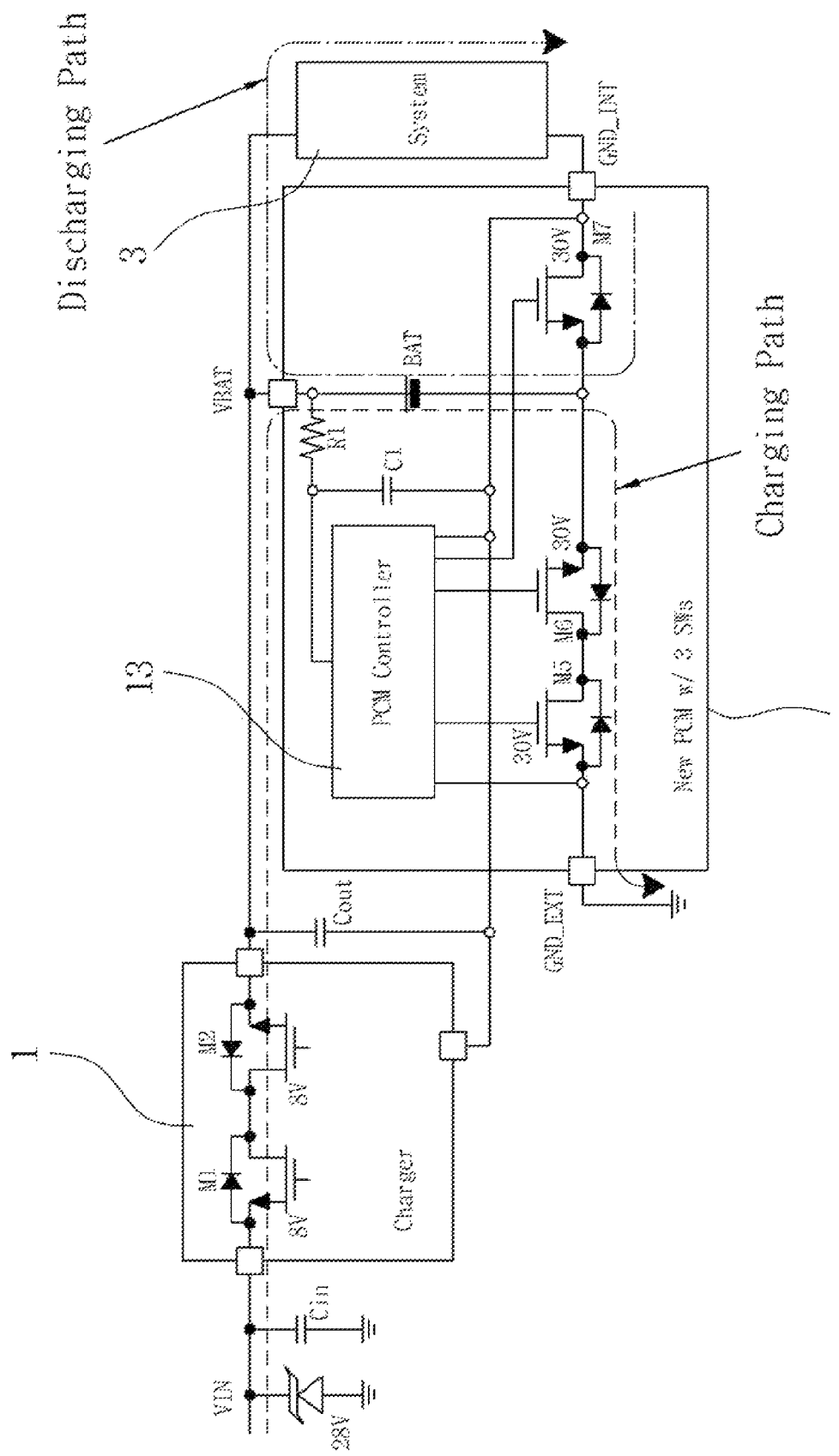
FIG. 5 is a diagram showing a battery protection circuit module device according to another embodiment of the present invention.

FIG. 5 illustrates a battery protection circuit module device according to a second embodiment of the present invention, which includes:

a charging unit 1 configured to comprise first and second MOSFET switches M1 and M2 and to supply externally input power to a battery BAT or a system 3;

a battery protection circuit module 10 configured to comprise the battery BAT, third and fourth MOSFET switches M5 and M6 connected in series to a minus terminal of the battery BAT, and configured to be selectively turned on and off under the control of a PCM controller 13 so that the battery BAT is selectively and electrically connected to and disconnected from an outside upon charging; a fifth MOSFET switch M7 connected in series to the minus terminal of the battery BAT and configured to be selectively turned on and off under the control of a PCM controller 13 so that the battery BAT is selectively and electrically connected to and disconnected from the system 3 upon discharging; a resistor R1 and a capacitor C1 configured to detect a voltage of the battery BAT and to supply the voltage of the battery BAT to the PCM controller 13 as driving power; and the PCM controller 13 configured to control the third and fourth MOSFET switches M5 and M6 based on a state of the voltage of the battery BAT so that the third and fourth MOSFET switches M5 and M6 are used upon charging and the fifth MOSFET switch M7 is turned on upon discharging; and the system 3 configured to be operated using the voltage of the battery BAT or externally input voltage.

The second embodiment of the present invention is configured such that the third and fourth MOSFET switches M5 and M6 are used only upon changing and the separate fifth MOSFET switch M7 is used only upon discharging.

That is, upon charging, the third and fourth MOSFET switches M5 and M6 are turned on under the control of the PCM controller 13, and thus the battery BAT is charged with power. In contrast, upon discharging, the fifth MOSFET switch M7 is turned on under the control of the PCM controller 13, and thus power stored in the battery BAT is supplied to the system 3, thus being discharged from the battery BAT.

Although in the second embodiment, on-resistance attributable to the third and fourth MOSFET switches M5 and M6 occurs upon charging, only on-resistance attributable to the single fifth MOSFET switch M7 occurs upon discharging, thereby reducing on-resistance upon discharging compared to the conventional technology.

Third Embodiment

Figure 6:
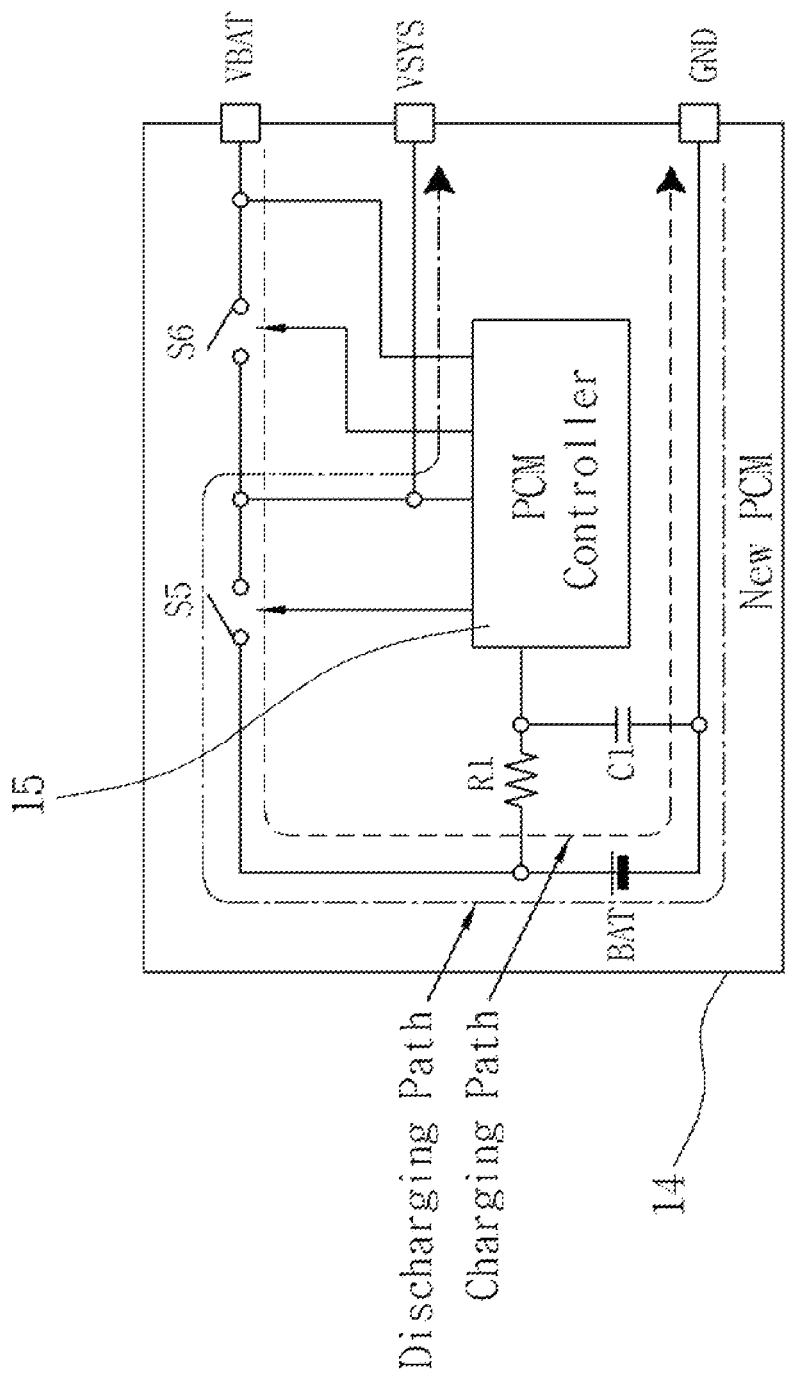
FIGS. 6 and 7 are diagrams showing a battery protection circuit module device according to a third embodiment of the present invention.
Figure 7:
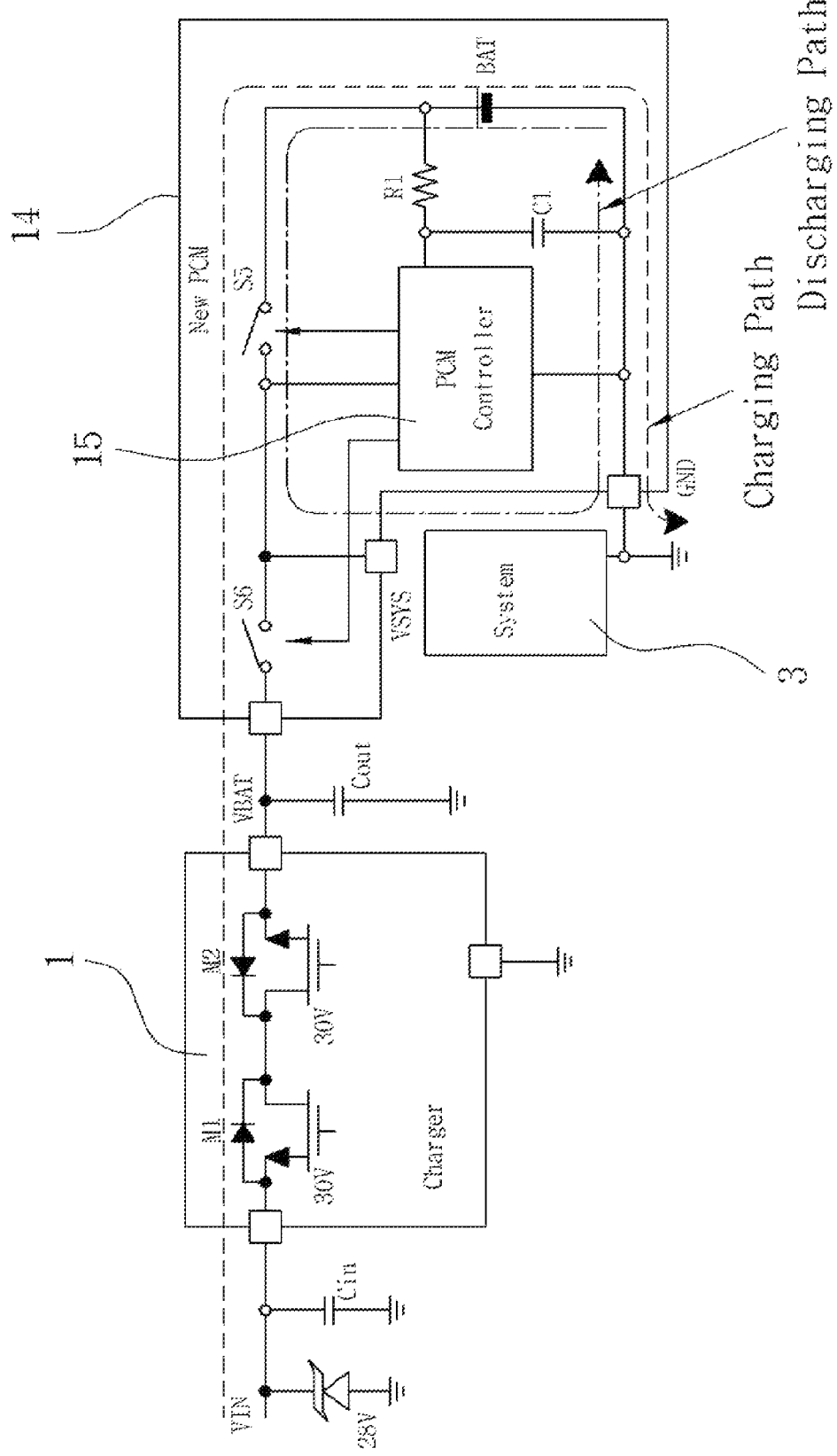

FIGS. 6 and 7 illustrate a battery protection circuit module device according to a third embodiment of the present invention, which includes:

a charging unit 1 configured to comprise first and second MOSFET switches M1 and M2 and to supply externally input power to a battery BAT or a system 3;

a battery protection circuit module 14 configured to comprise the battery BAT, first and second switches S5 and S6 connected in series to a plus terminal of the battery BAT, and configured to be selectively turned on and off under the control of a PCM controller 15 so that the battery BAT is selectively and electrically connected to and disconnected from an outside; a resistor R1 and a capacitor C1 configured to detect a voltage of the battery BAT and to supply the voltage of the battery BAT to the PCM controller 15 as driving power; and the PCM controller 15 configured to control the first and second switches S5 and S6 based on a state of the voltage of the battery BAT so that the first and second switches S5 and S6 are selectively turned on and off and thus the battery BAT is selectively charged and discharged; and the system 3 configured to be operated using the voltage of the battery BAT or externally input voltage;

wherein an intermediate portion of the first and second switches S5 and S6 of the battery protection circuit module 14 is connected to a VSYS terminal of the system 3, and only the first switch S5 is turned on upon discharging.

The third embodiment of the present invention is configured such that the first and second switches S5 and S6 are connected to the plus terminal of the battery BAT, the intermediate portion of the first and second switches S5 and S6 is connected to the VSYS terminal of the system 3, and only the first switch S5 is turned on upon discharging.

Accordingly, upon charging, the first and second switches S5 and S6 are all operated, and thus charging is performed. Upon discharging, the first switch S5 is turned on under the control of the PCM controller 15, and thus discharging is performed. In contrast, upon discharging, only the single first switch S5 is operated, and thus the effect of on-resistance being considerably reduced compared to the conventional technology can be expected.

The battery protection circuit module device according to the present invention has the advantage of significantly preventing a reduction in the duration of use of a battery attributable to a voltage drop resulting from peak current and on-resistance occurring upon discharging because the on-resistance of the switching devices occurring upon discharging is reduced to half, the advantage of considerably reducing the manufacturing cost required to manufacture a charger IC because a low rated device can be used in the charger IC, and the advantage of increasing the stability and reliability of a portable product because a charger and a system, other than a protection circuit module controller, can remain insulated from a stationary device even when the portable product is coupled to the stationary device and thus the portable product is not influenced by abnormal input from the stationary device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery protection circuit module device, comprising:
a charging unit configured to comprise first and second MOSFET switches and to supply externally input power to a battery or a system;
a battery protection circuit module configured to comprise the battery, third and fourth MOSFET switches connected in series to a minus terminal of the battery, and configured to be selectively turned on and off under the control of a protection circuit module (PCM) controller so that the battery is selectively and electrically connected to and disconnected from an outside; a resistor and a capacitor configured to detect a voltage of the battery and to supply the voltage of the battery to the PCM controller as driving power; and the PCM controller configured to control the third and fourth MOSFET switches based on a state of the voltage of the battery so that the third and fourth MOSFET switches are selectively turned on and off and thus the battery is selectively charged and discharged; and the system configured to be operated using the voltage of the battery or externally input voltage;

wherein the third and fourth MOSFET switches of the battery protection circuit module are connected to each other via a common drain structure and a common drain terminal is connected to an internal ground, so that only the fourth MOSFET switch is turned on upon discharging.

2. A battery protection circuit module device, comprising:

a charging unit configured to comprise first and second MOSFET switches and to supply externally input power to a battery or a system;

a battery protection circuit module configured to comprise the battery, third and fourth MOSFET switches connected in series to a minus terminal of the battery, and configured to be selectively turned on and off under the control of a PCM controller so that the battery is selectively and electrically connected to and disconnected from an outside upon charging; a fifth MOSFET switch connected in series to the minus terminal of the battery and configured to be selectively turned on and off under the control of a PCM controller so that the battery is selectively and electrically connected to and disconnected from the system upon discharging; a resistor and a capacitor configured to detect a voltage of the battery and to supply the voltage of the battery to the PCM controller as driving power; and the PCM controller configured to control the third and fourth MOSFET switches based on a state of the voltage of the battery so that the third and fourth MOSFET switches are used upon charging and the fifth MOSFET switch is turned on upon discharging; and the system configured to be operated using the voltage of the battery or externally input voltage.

3. A battery protection circuit module device, comprising:

a charging unit configured to comprise first and second MOSFET switches and to supply externally input power to a battery or a system;

a battery protection circuit module configured to comprise the battery, first and second switches connected in series to a plus terminal of the battery, and configured to be selectively turned on and off under the control of a PCM controller so that the battery is selectively and electrically connected to and disconnected from an outside; a resistor and a capacitor configured to detect a voltage of the battery and to supply the voltage of the battery to the PCM controller as driving power; and the PCM controller configured to control the first and second switches based on a state of the voltage of the battery so that the first and second switches are selectively turned on and off and thus the battery is selectively charged and discharged; and the system configured to be operated using the voltage of the battery or externally input voltage;

wherein an intermediate portion of the first and second switches of the battery protection circuit module is connected to a VSYS terminal of the system, and only the first switch is turned on upon discharging.

* * * * *